( 12 ) United States Patent
Tordin et al.

(10) Patent No.: US 9,644,565 B2
(45) Date of Patent: May 9, 2017

(54) METHOD OF CONTROLLING A FUEL INJECTION

(71) Applicant: GM GLOBAL TECHNOLOGY OPERATIONS LLC, Detroit, MI (US)

(72) Inventors: Serena Tordin, Settimo Torinese (CH); Antonio Massaro, Turin (CH)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 14/459,018

(22) Filed: Aug. 13, 2014

(65) Prior Publication Data

US 2015/0051814 A1 Feb. 19, 2015

(30) Foreign Application Priority Data

Aug. 13, 2013 (GB) .................................. 1314460.5

(51) Int. Cl.
| | |
|---|---|
| *G06F 7/00* | (2006.01) |
| *G06F 17/00* | (2006.01) |
| *F02D 41/40* | (2006.01) |
| *F02D 41/24* | (2006.01) |

(52) U.S. Cl.
CPC ......... *F02D 41/40* (2013.01); *F02D 41/2416* (2013.01); *F02D 41/2422* (2013.01); *F02D 41/2467* (2013.01); *F02D 2200/0614* (2013.01); *Y02T 10/44* (2013.01)

(58) Field of Classification Search
CPC .. F02D 41/40; F02D 41/2422; F02D 41/2467; F02D 41/2416; F02D 2200/0614; F02D 41/1402; F02D 28/00; F02D 41/248; Y02T 10/44
See application file for complete search history.

(56) References Cited

U.S. PATENT DOCUMENTS

| | | | | |
|---|---|---|---|---|
| 4,676,215 A | * | 6/1987 | Blocher | F02D 41/1408 123/339.19 |
| 4,901,240 A | * | 2/1990 | Schmidt | F02D 41/2454 123/438 |
| 5,464,000 A | * | 11/1995 | Pursifull | F02D 41/1476 123/674 |

(Continued)

FOREIGN PATENT DOCUMENTS

| | | |
|---|---|---|
| EP | 0241030 A2 | 10/1987 |
| EP | 0859141 A2 | 8/1998 |

(Continued)

*Primary Examiner* — Stephen K Cronin
*Assistant Examiner* — David Hamaoui
(74) *Attorney, Agent, or Firm* — Lorenz & Kopf, LLP.

(57) ABSTRACT

A method of controlling an amount of fuel to be injected by a fuel injector into a cylinder of an internal combustion engine is disclosed. A map stores values of a fuel injection quantity drift of said injector. A fuel injection quantity drift is estimated and stored in a corresponding map point to a current engine operating point. A set of map points whose distance from said corresponding map point is smaller than a given distance are selected. All map points of the set of map points are modified by multiplying their entries by a radial weighing factor. The amount of fuel to be injected by the fuel injector to be the requested amount of fuel is corrected by means of the corresponding entry of the map.

10 Claims, 4 Drawing Sheets

(56) References Cited

U.S. PATENT DOCUMENTS

| | | | | |
|---|---|---|---|---|
| 5,713,332 A | * | 2/1998 | Adler | B60T 8/174 123/406.19 |
| 6,360,733 B1 | * | 3/2002 | Uberti Bona Blotto | F02D 41/008 123/486 |
| 6,397,112 B1 | * | 5/2002 | Coatesworth | F02D 41/1402 700/37 |
| 6,961,650 B2 | * | 11/2005 | Itoh | F02D 41/2416 701/104 |
| 7,725,248 B2 | * | 5/2010 | Hagel | F02D 41/2416 123/478 |
| 2003/0150428 A1 | * | 8/2003 | Hozuki | F02D 41/2416 123/486 |
| 2015/0051813 A1 | * | 2/2015 | Ramundo | F02D 41/0085 701/104 |
| 2015/0152804 A1 | * | 6/2015 | Sakayanagi | F02D 41/2416 701/115 |

FOREIGN PATENT DOCUMENTS

| | | | |
|---|---|---|---|
| JP | 62121846 A | | 6/1987 |
| JP | 04175434 A | * | 6/1992 |
| WO | 0166377 A1 | | 9/2001 |

* cited by examiner

METHOD OF CONTROLLING A FUEL INJECTION

CROSS REFERENCE TO RELATED APPLICATION

This application claims priority to GB Patent Application No. 1314460.5 filed Aug. 13, 2013, which is incorporated herein by reference in its entirety.

TECHNICAL FIELD

The present disclosure relates to a method of controlling a fuel injection. The method is particularly related to improve the control of the fuel injection quantity variation during the fuel injector lifetime.

BACKGROUND

It is known that modern engines are provided with a fuel injection system for directly injecting the fuel into the cylinders of the engine. The fuel injection system generally includes a fuel common rail and a plurality of electrically controlled fuel injectors, which are individually located in a respective cylinder of the engine and which are hydraulically connected to the fuel rail through dedicated injection lines.

The fuel injection control is an important aspect of the engine management system, in order to ensure the engine performance in terms of available torque and reduced fuel consumption and emissions. Such control includes several strategies, one of which is called Fuel Set-point Adaptation strategy (FSA). FSA is used to detect the injection drift that affects injectors commonly used in Diesel applications during their lifetime and produces an increase of nitrogen oxides (NOx) and particulate matter (PM). FSA strategy is also used to detect fuel injection system fault and an injector's drift has to be identified in any component of the system in a quick way. FSA strategy estimates the injection drift considering the intake air mass and the oxygen concentration in the exhaust gas and stores the fuel quantity drift values in a map, storing values of the fuel injection quantity drift, with map points being arranged along an x-axis and along a y-axis representing engine operating points. In particular, such engine operating points are defined by different values of engine speed and requested amount of fuel to be injected by the fuel injector.

The map, which can be considered an adaptive map, is filled in using a spatial propagation logic (so called, "four cells region"), in order to get a smooth filling and avoid unphysical oscillation. In particular, by means of the spatial propagation logic, the map points close to a current engine operating point are updated by spreading the estimated fuel injection quantity drift. The stored value is obtained weighing the fuel injection quantity drift with two factors that take into account the relative distances between the learned engine point and the nearby map points, according to the following equations:

$$IR_x = \frac{\text{engine\_speed} - n(j)}{n(j+1) - n(j)}$$

$$IR_y = \frac{\text{engine\_speed} - V(i)}{V(i+1) - V(i)}$$

where:
$IR_x$=weighing factor along x axis (engine speed);
$IR_y$=weighing factor along y axis (requested amount of fuel);
$n(j)$, $n(j+1)$=values of engine speed stored in the map; engine_speed=current engine speed value, with $n(j)$<engine_speed<$n(j+1)$;
$V(i)$, $V(i+1)$=values of requested amount of fuel, stored in the map; and
fuel_request=requested amount of fuel, with $V(i)$<fuel_request<$V(i+1)$.

Figure 3:
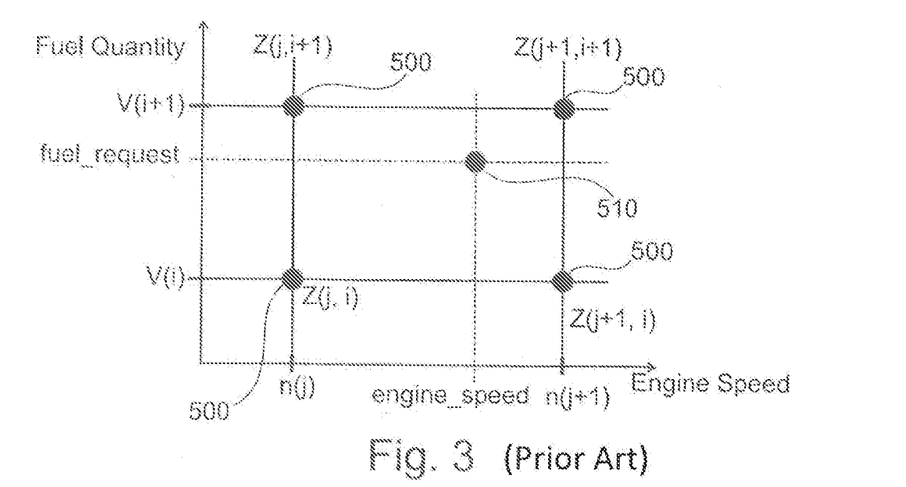
FIG. 3 is a portion of an adaptive map for a Fuel Set-point Adaptation strategy, according to a known embodiment.

In FIG. 3, an example of a portion of the adaptive map is shown. The map is built as function of the engine operating conditions, namely the engine speed along the X-axis and the requested amount of fuel along the Y-axis. As already mentioned, the map points are the values of the fuel injection quantity drift for each engine operating condition (i.e. for each combination of engine speed values and requested amount of fuel values). In the map portion, as illustrated in FIG. 3, a stored injection drift value in a map point 510 can be identified. By using the spatial propagation logic, a spread fuel quantity drift is calculated for the four map points 500 (the "four cells region"), by means of the stored value 510 and the weighing factors $IR_x$, $IR_y$.

By using the known FSA strategy, the selection of the cells and the weighing factors are too dependent on the adaptive map calibration and the weighing factors are not homogeneously defined in the map. This implies the risk of a not optimized calibration of the strategy. Moreover, if the injectors' physical behavior is quite linear and homogenous over more than one "four cells region", it is not possible to extend the map spreading outside the "four cells region". Furthermore, in case of two engine operating points very close to each other but inside a different "four cells region", the updated values can be very different between each other, producing a discontinuity and a loss of information. Finally, a dedicated logic for the boundary area is needed to manage the situation in which the engine point to be learnt is outside the adaptive map. As a conclusion, the present spatial propagation logic is not enough fast and smooth, above all in case the FSA strategy has to be also used to detect fuel injection system fault.

Therefore, a need exists for a method that controls the amount of fuel to be injected in an internal combustion engine, and, improving the known FSA strategy, allows to obtain a smooth filling of the FSA map, taking into account the physical behavior of the injectors, and a faster learning, if the FSA correction needs to be effective as soon as possible in the injectors lifetime.

SUMMARY

In accordance with the present disclosure a method and apparatus for controlling an amount of fuel to be injected by a fuel injector into the cylinder of an internal combustion engines is provided with the help of a Fuel Set-point Adaptation strategy, which utilizes a map with a new, faster and more accurate learning strategy. The present disclosure may be embodied as a method, an apparatus, an engine, a computer program and a computer program product.

For example, an embodiment of the disclosure provides a method of controlling an amount of fuel to be injected by a fuel injector into a cylinder of an internal combustion engine by means of a map. The map stores values of a fuel injection quantity drift of said injector, with map points of the map being arranged along an x-axis and along a y-axis representing engine operating points. The engine operating points are defined by different values of engine speed and requested amount of fuel to be injected by the fuel injector. The method included: estimating a fuel injection quantity drift and storing it in a corresponding map point to a current engine operating point, selecting a set of map points whose distance from said corresponding map point is smaller than a given distance, modifying all map points of said set of map points by multiplying their entries by a radial weighing factor, and defining the amount of fuel to be injected by the fuel injector to be the requested amount of fuel corrected by means of the corresponding entry of the map.

Consequently, an apparatus is disclosed for controlling an amount of fuel to be injected by a fuel injector into a cylinder of an internal combustion engine. The apparatus includes a controller configured to estimate a fuel injection quantity drift and storing it in a corresponding map point to a current engine operating point, select a set of map points whose distance from said corresponding map point is smaller than a given distance, modify all map points of said set of map points by multiplying their entries by a radial weighing factor, and define the amount of fuel to be injected by the fuel injector to be the requested amount of fuel corrected by means of the corresponding entry of the map.

An advantage of these embodiments is to define the fuel injection quantity, corrected by a proper value of the fuel injection quantity drift. The correction is performed by filling and updating a map containing the values of the fuel injection quantity drift. The updating is carried out using a so called radial writing logic. In this way, the map filling can be extended, by spreading its values in the near regions, setting a proper predetermined distance. Moreover, in case of learning in two engine operating points very close to each other, the map filling is performed in a similar way, avoiding discontinuity between values of such close engine operating points. Finally, the radial logic is able to manage engine points inside and outside the map in the same way, without dedicated logics for the boundary regions.

According to another embodiment of the present disclosure the distance between the corresponding map point and each map point of the set of map points is calculated according to the following equations:

$$Xdist(j) = \frac{engine\_speed - n(j)}{Xnorm}$$

$$Ydist(i) = \frac{fuel\_request - V(i)}{Ynorm}$$

$$distance(j, i) = \frac{Ynorm}{\sqrt{Xdist(j)^2 + Ydist(i)^2}}$$

Consequently, the apparatus further includes means for calculating the distance between said corresponding map point and each map point of said set of map points, according to the equations set forth above. An advantage of this embodiment is that, the distance between two map points is homogeneously determined and, consequently, the map point selection is independent on the map calibration.

According to a further embodiment of the present disclosure, the radial weighing factor is calculated according to the following equation:

$$weight(j, i) = \frac{LearningRadius - distance(j, i)}{LearningRadius}$$

Consequently, the apparatus further includes means for calculating said radial weighing factor, according to the equation set forth above. An advantage of this embodiment is that the weighing factors are independent on the map calibration and the weighing factor is homogeneously defined in the map.

The method according to one of its aspects can be carried out with the help of a computer program including a program-code for carrying out all the steps of the method described above, and in the form of computer program product including the computer program. The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background or the following detailed description.

Figure 1:
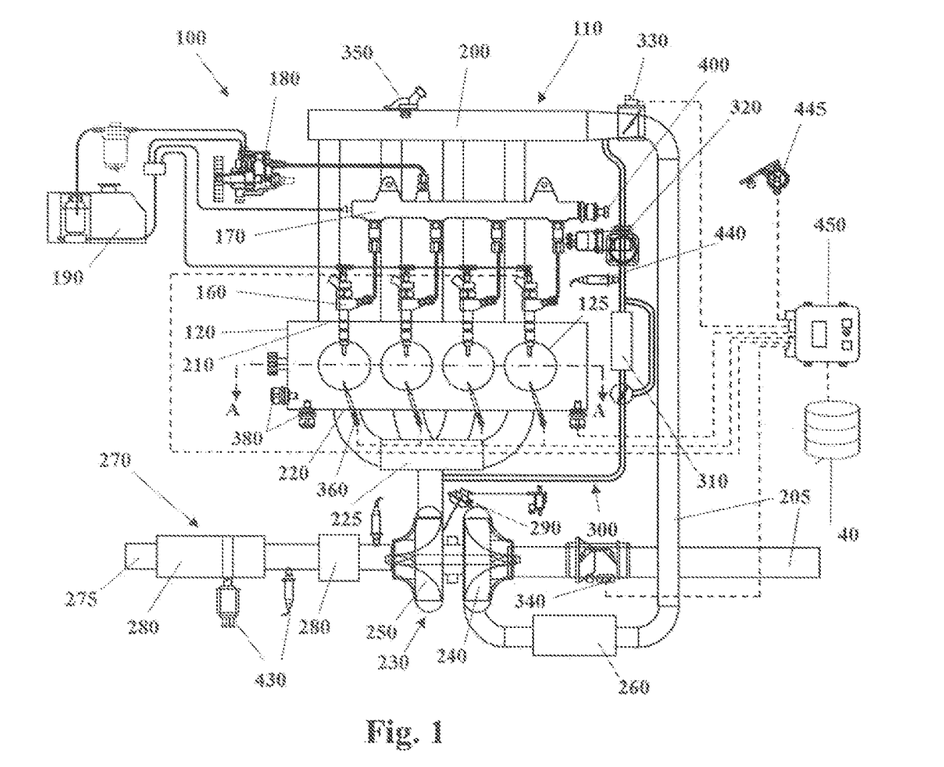
FIG. 1 shows an automotive system.
Figure 2:
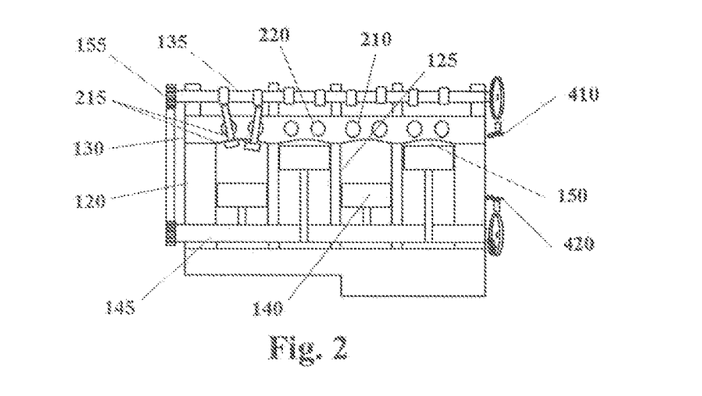
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

According to a preferred embodiment of the present disclosure, the method of controlling an amount of fuel to be injected in the ICE, by taking into account the fuel injection quantity drift, is based on the FSA strategy, which estimates the injection drift, considering the difference between the requested amount of fuel and the measured amount of injected fuel. Such differences, representing the values of the fuel injection quantity drift, are stored and updated in a map, better, an adaptive map. Said adaptive map is function of the engine operating points, arranged along an x-axis and along a y-axis, the engine operating points being defined by different values of engine speed and requested amount of fuel fuel_request. The map is filled by means of a spatial propagation based on a radial logic.

At first the map 515 is defined, setting the values of engine speed and requested amount of fuel in the map points (so called, break-points). Each map point contains a value of the fuel injection quantity drift. Then, it would be recommended to identify normalization factors $X_{norm}$, $Y_{norm}$ for the values of engine speed and requested amount of fuel, in order to define a normalized and homogenous distance in the adaptive map 515 and take into account the drifted injectors typical behavior. As an example, this normalization factors are calibrated values of, respectively, engine speed and requested amount of fuel, so that a ratio of an engine speed by $X_{norm}$ or a ratio of a requested amount of fuel by $Y_{norm}$ will give zero-dimensional parameters.

Figure 6:
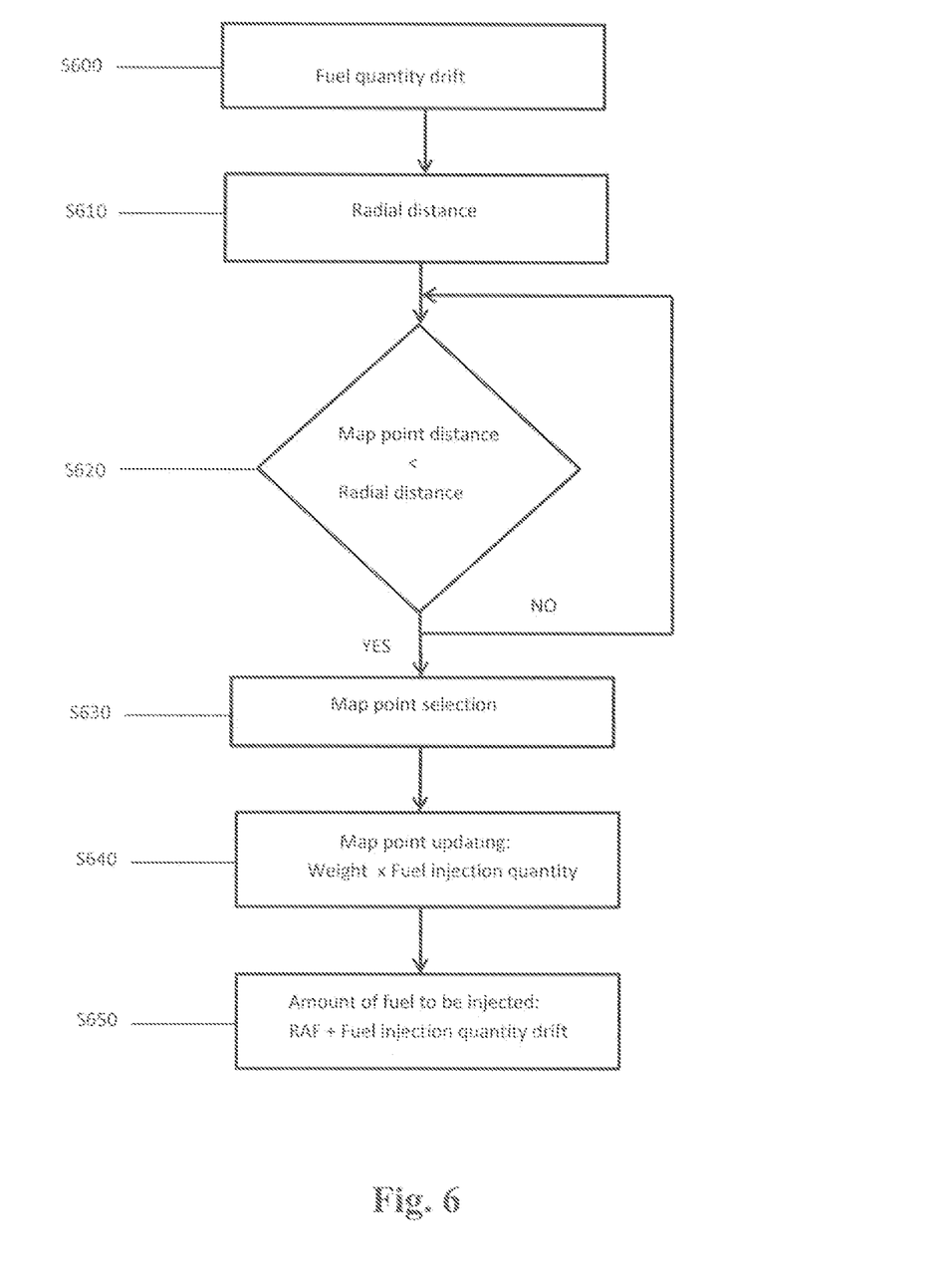
FIG. 6 shows a flowchart of the method according to an embodiment of the present disclosure.

Following the flowchart in FIG. 6, the fuel injection quantity drift is estimated S600 for a current engine operating point. As further preliminary step, a predetermined radial distance (so called, learning radius, 540) is chosen S610 for the whole adaptive map 515. Such learning radius 540 defines the maximum radial distance at which a learning value for generic values of engine speed and requested amount of fuel (i.e. an estimated and stored fuel injection quantity drift) can be spread, taking into account the region where the physical behavior of the injectors can be considered linear and homogeneous. As an example, the learning radius is defined so that the circle, having as center the learning value and as radius the learning radius, will include at least the closest four map points.

Figure 4:
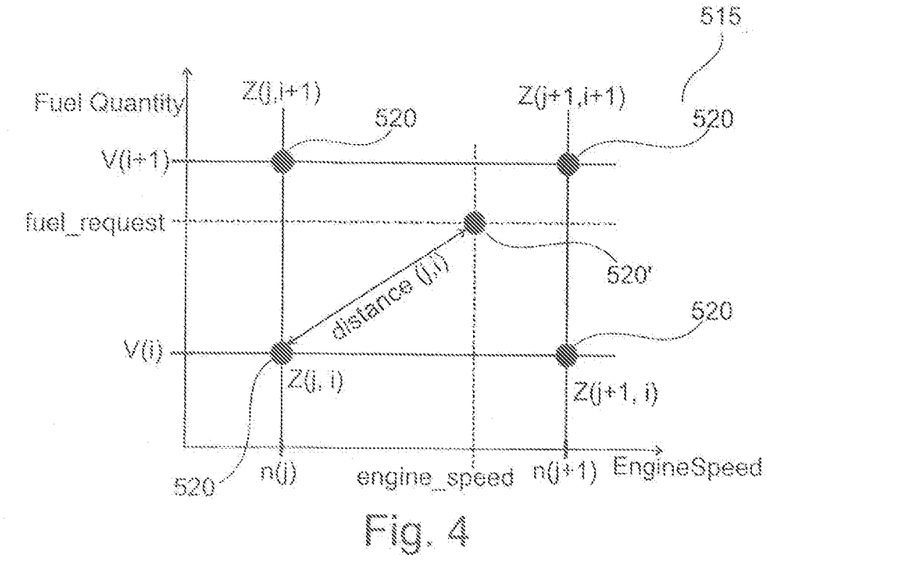
FIG. 4 is a portion of an adaptive map for a Fuel Set-point Adaptation strategy, according to an embodiment of the present disclosure.

After such preliminary steps, the map point selection S630 is performed on the adaptive map. FIG. 4 shows a portion of the adaptive map according to an embodiment of the present disclosure. The map is built as function of the engine operating conditions, namely the engine speed along the X-axis and the requested amount of fuel along the Y-axis. The map points are the values of the fuel injection quantity drift for each engine operating condition (i.e. for each combination of values of engine speed and requested amount of fuel). In particular, in FIG. 4 a corresponding map point 520' to a current engine operating point, having a stored fuel quantity drift, and a selected set of map points 520 are shown.

During the FSA learning phase (i.e. when a generic fuel injection quantity drift is estimated as the difference between a requested amount of fuel and a measured fuel quantity), the distance between a corresponding map point 520' to a current engine operating point and a generic map point is calculated and if the distance is smaller than S520 the learning radius 540, the map point is selected. The distance between a corresponding map point 520' to a current engine operating point and each selected map point 520" is calculated, according to the following equations:

$$Xdist(j) = \frac{engine\_speed - n(j)}{Xnorm}$$

$$Ydist(i) = \frac{fuel\_request - V(i)}{Ynorm}$$

$$distance(j, i) = \frac{Ynorm}{\sqrt{Xdist(j)^2 + Ydist(i)^2}}$$

where:
  Xdist (j)=distance between the corresponding map point to a current engine operating point and a selected map point, projected along x-axis;
  Ydist (i)=distance between the corresponding map point to a current engine operating point and a selected map point, projected along y-axis;
  n(j)=value of engine speed, stored in the map;
 engine_speed=current engine speed value;
  Xnorm=normalization factor for values of engine speed;
  V(i)=value of requested amount of fuel, stored in the map;
 fuel_request=requested amount of fuel;
  Ynorm=normalization factor for values of requested amount of fuel; and distance (j,i)=distance between the corresponding map point to a current engine operating point and a selected map point.

Figure 5:
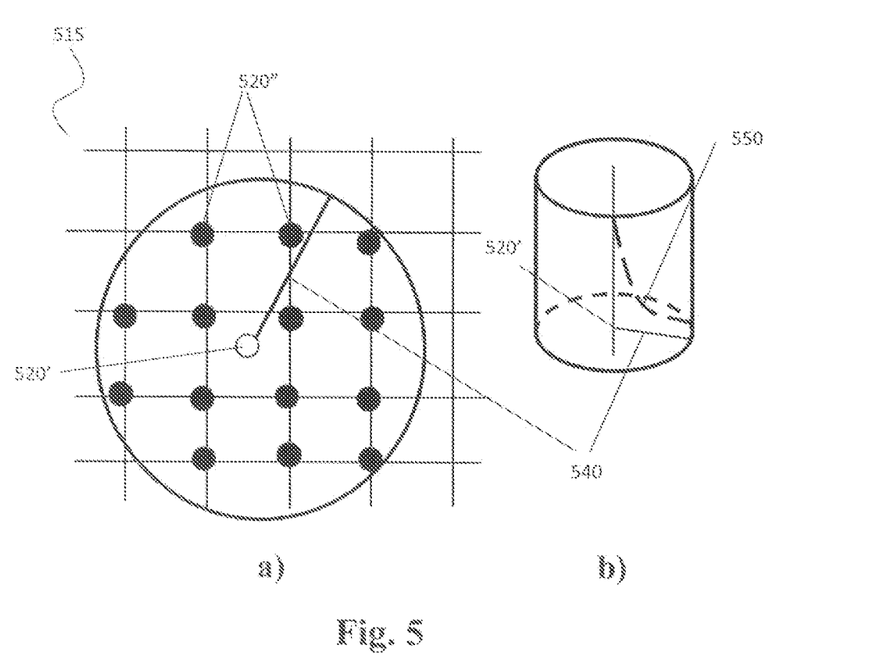
FIG. 5 is a further representation of the adaptive map in FIG. 4.

As further step, for each map point, which is considered close enough to the corresponding map point 520' to a current engine operating point (i.e. belonging to the selected set of map points 520"), a radial weighing factor is calculated using a weighing function 550. FIG. 5 illustrates said weighing function. In the left part (FIG. 5*a*), a portion of the adaptive map 515 is shown, including a corresponding map point 520' to a current engine operating point and a selected set of map points 520", inside the learning radius 540. An example of weighing function is shown in FIG. 5*b*. In such representation according to a cylindrical coordinates system, the polar axis is the distance between a generic map point and the corresponding map point 520' to a current engine operating point. As known, such distance will be equal to the learning radius 540 value, as maximum value. The cylindrical axis represents the radial weighing factor values. In this example, the weighing function is a quadratic function of the distance of a generic map point from the map point 520' (origin of the polar axis). The equation of such weighing function, which will provide case by case the proper radial weighing factor weight (j,i), is the following:

$$weight(j, i) = \frac{LearningRadius - distance(j, i)}{LearningRadius}$$

where:
  weight (j, i)=radial weighing factor;
  distance (j,i)=distance between the corresponding map point to a current engine operating point and a selected map point; and
learning radius=predetermined radial distance.

Finally, the selected map points are updated S640 with the values of the estimated fuel injection quantity drift, by weighing such values using the radial weighing factor; therefore, an amount of fuel injection can be controlled by correcting S650 the requested amount of fuel with the updated values of the fuel injection quantity drift.

Such radial writing logic can lead to the following improvements. If the typical injector's drift is linear over more than one "four cells region", the map filling can be extended, setting a proper radius. The map points selection and the weighing factors are independent by map calibration and the weighing is homogeneously defined in the map. In case of learning, which is done in two engine points very close to each other, the map filling is performed in a similar way, avoiding discontinuity between values of close engine points. Finally, the radial logic is able to manage engine points inside and outside the adaptive map in the same way, without dedicated logics for the boundary regions Summarizing, the described method, that controls the amount of fuel to be injected, by taking into account the injection drift, improves the present FSA strategy and allows to obtain a smooth filling of the FSA map, taking into account the physical behavior of the injectors, and a faster learning, if the FSA correction needs to be effective as soon as possible in the injectors lifetime.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of controlling an amount of fuel to be injected by a fuel injector into a cylinder of an internal combustion engine using, the method including the following steps:
defining a map storing map points for a fuel injection quantity drift of an injector, the map points being arranged along an x-axis as a function of engine operating points along a y-axis, wherein the engine operating points are defined by different values of engine speed and requested amount of fuel to be injected by the fuel injector;
estimating a fuel injection quantity drift and storing it in a corresponding map point to a current engine operating point;
selecting a set of map points whose distance from said corresponding map point is less than a given distance;
modifying each map point of said set of map points by a radial weighing factor;
correcting the amount of fuel to be injected by the fuel injector to be the requested amount of fuel by the corresponding entry of the map to define a corrected fuel request; and
controlling an amount of fuel to be injected by the fuel injector using the corrected fuel request;
wherein the distance between said corresponding map point and each map point of said set of map points is calculated according to the following equations:

$$Xdist(j) = \frac{engine\_speed - n(j)}{Xnorm}$$

$$Ydist(i) = \frac{fuel\_request - V(i)}{Ynorm}$$

$$distance(i, j) = \frac{Ynorm}{\sqrt{Xdist(j)^2 + Ydist(i)^2}}$$

where:
Xdist(j)=distance between the corresponding map point to a current engine operating point and a selected map point, projected along the x-axis;
Ydist(i)=distance between the corresponding map point for a current engine selected map point, projected along the y-axis;
n(j)=value of engine speed, stored in the map;
engine_speed=current engine speed value;
Xnorm=normalization factor values of engine speed;
V(i)=value of requested amount of fuel, stored in the map;
fuel request=requested amount of fuel;
Ynorm=normalization factor for values of requested amount of fuel; and
distance (j,i)=distance between the corresponding map point to a current engine operating point and a selected map point.

2. The method according to claim 1, wherein said radial weighing factor is calculated according to the following equation:

$$weight(j, i) = \frac{LearningRadius - distance(j, i)}{LearningRadius}$$

where:
weight(j,i)=radial weighing factor;
distance(j,i)=distance between the corresponding map point to a current engine operating point and a selected map point; and
learning radius=predetermined radial distance.

3. A computer program comprising a computer-code suitable for performing the method according to claim 1.

4. A computer program product on which the computer program according to claim 3 is stored.

5. A control apparatus for an internal combustion engine, comprising an electronic control unit, a data carrier associated to the electronic control unit and a computer program according to claim 3 stored in the data carrier.

6. A method of controlling an amount of fuel to be injected by a fuel injector into a cylinder of an internal combustion engine using, the method including the following steps:
defining a map storing map points for a fuel injection quantity drift of an injector, the map points being arranged along an x-axis as a function of engine operating points along a y-axis, wherein the engine operating points are defined by different values of engine speed and requested amount of fuel to be injected by the fuel injector;
estimating a fuel injection quantity drift and storing it in a corresponding map point to a current engine operating point;
selecting a set of map points whose distance from said corresponding map point is less than a given distance;
modifying each map point of said set of map points by a radial weighing factor;
correcting the amount of fuel to be injected by the fuel injector to be the requested amount of fuel by the corresponding entry of the map to define a corrected fuel request; and
controlling an amount of fuel to be injected by the fuel injector using the corrected fuel request;
wherein said radial weighing factor is calculated according to the following equation:

$$weight(j, i) = \frac{LearningRadius - distance(j, i)}{LearningRadius}$$

where:
weight(j,i)=radial weighing factor;
distance(j,i)=distance between the corresponding map point to a current engine operating point and a selected map point; and
learning radius=predetermined radial distance.

7. The method of claim 6, wherein the distance between said corresponding map point and each map point of said set of map points is calculated according to the following equations:

$$Xdist(j) = \frac{engine\_speed - n(j)}{Xnorm}$$

$$Ydist(i) = \frac{fuel\_request - V(i)}{Ynorm}$$

$$distance(i, j) = \frac{Ynorm}{\sqrt{Xdist(j)^2 + Ydist(i)^2}}$$

where:

Xdist(j)=distance between the corresponding map point to a current engine operating point and a selected map point, projected along the x-axis;

Ydist(i)=distance between the corresponding map point for a current engine operating point and a selected map point, projected along the y-axis;

n(j)=value of engine speed, stored in the map;

engine_speed=current engine speed value;

Xnorm=normalization factor for values of engine speed;

V(i)=value of requested amount of fuel, stored in the map;

fuel request=requested amount of fuel;

Ynorm=normalization factor for values of requested amount of fuel; and distance (j,i)=distance between the corresponding map point to a current engine operating point and a selected map point.

8. A computer program comprising a computer-code suitable for performing the method according to claim 6.

9. A computer program product on which the computer program according to claim 8 is stored.

10. A control apparatus for an internal combustion engine, comprising an electronic control unit, a data carrier associated to the electronic control unit and a computer program according to claim 8 stored in the data carrier.

* * * * *